(12) United States Patent
Onomatsu et al.

(10) Patent No.: US 7,610,010 B2
(45) Date of Patent: Oct. 27, 2009

(54) BROADCAST RECEIVER WITH SELECTIVELY STORING CHANNEL AND ANTENNA INFORMATION

(75) Inventors: Takehiro Onomatsu, Osaka (JP); Shusuke Narita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 575 days.

(21) Appl. No.: 11/166,055

(22) Filed: Jun. 24, 2005

(65) Prior Publication Data
US 2006/0003693 A1    Jan. 5, 2006

(30) Foreign Application Priority Data
Jun. 25, 2004   (JP)   ............... P2004-188643

(51) Int. Cl.
*H04H 20/71* (2008.01)
(52) U.S. Cl. ................ 455/3.01; 455/151.1; 455/161.1; 455/193.1; 455/63.4
(58) Field of Classification Search .............. 455/151.1, 455/161.1, 193.1, 3.02–3.06, 25, 63.4, 575.7; 725/68–72, 59; 343/751, 754, 757, 758, 343/776, 777
See application file for complete search history.

(56) References Cited
FOREIGN PATENT DOCUMENTS

| JP | 6-334931 | 12/1994 |
| JP | 8-250920 | 9/1996 |
| JP | 11-298226 | 10/1999 |
| JP | 2001-168627 | 6/2001 |

OTHER PUBLICATIONS

Translation of JP # 06-334931.*
Translation of JP # 2001-168627.*
Japanese Office Action for Japanese Application No. 2004-188643, Mailed on Jul. 23, 2007, with English translation thereof (4 pages).
Patent Abstracts of Japan, Publication No. 06-334931, Publication Date Dec. 2, 1994 (1 page).
Patent Abstracts of Japan, Publication No. 2001-168627, Publication Date Jun. 22, 2001 (1 page).
Patent Abstracts of Japan, Publication No. 11-298226, Publication Date Oct. 29, 1999 (1 page).

\* cited by examiner

*Primary Examiner*—Thanh C Le
*Assistant Examiner*—Fayyaz Alam
(74) *Attorney, Agent, or Firm*—Osha • Liang LLP

(57) ABSTRACT

A broadcast receiver for receiving a broadcasting of a prescribed channel transmitted from a broadcasting station by a directivity switching antenna capable of switching directivity to a plurality of preset directions, includes a control unit for controlling the directivity switching antenna to switch a directive direction, a memory for storing channel information showing the prescribed channel and direction information showing the directive direction of the directivity switching antenna, and an instructing unit for allowing a user to instruct the prescribed channel to be set as a receiving channel. When the instructing unit instructs the user to set the prescribed channel as the receiving channel, the control unit stores only the channel information of the prescribed channel in the memory.

6 Claims, 12 Drawing Sheets

| CHANNEL INFORMATION | DIRECTION INFORMATION OF SMART ANTENNA |
|---|---|
| 2, ntsc, ··· | 14, LEV**, ··· |
| 4, ntsc, ··· | 1, LEV**, ··· |
| 6, DTV, ··· | 3, LEV**, ··· |
| ⋮ | ⋮ |
| 69, ntsc, ··· | 10, LEV**, ··· |

T

| CHANNEL INFORMATION | DIRECTION INFORMATION OF SMART ANTENNA |
|---|---|
| 2, ntsc, ··· | 14, LEV**, ··· |
| 4, ntsc, ··· | 1, LEV**, ··· |
| 6, DTV, ··· | 3, LEV**, ··· |
| ⋮ | ⋮ |
| 69, ntsc, ··· | 10, LEV**, ··· |
| 9, DTV, ··· | |

BROADCAST RECEIVER WITH SELECTIVELY STORING CHANNEL AND ANTENNA INFORMATION

BACKGROUND OF THE INVENTION

1. Field of the Invention

The present invention relates to a broadcast receiver for receiving the broadcasting of a prescribed channel transmitted from a broadcasting station by a directivity switching antenna.

2. Description of the Related Art

In Japan, the airwave of a television broadcasting or the like is ordinarily transmitted from one base station. Accordingly, an antenna for receiving the broadcasting is fixed to a roof or a veranda of a residence toward the base station. The antenna is connected to a broadcast receiver so that the broadcasting transmitted from a plurality of broadcasting stations can be substantially entirely received. As compared therewith, overseas such as USA, airwaves are respectively individually transmitted from a plurality of broadcasting stations. Therefore, when the antenna is secured toward one direction, the broadcasting of the broadcasting station located in a direction to which the antenna is directed can be received, however, the broadcasting of the broadcasting station located in a direction to which the antenna is not directed cannot be received.

Thus, by considering the above-described circumstances, a broadcast receiver using an antenna capable of switching directivity (refer this antenna to as a directivity switching antenna, hereinafter.) has been proposed (see JP-A-2001-168627 (paragraphs 0019 to 0028, FIG. 2), JP-A-6-334931 (paragraphs 0041 to 0052, 0061, 0062, FIG. 7) and JP-A-11-298226 (paragraphs 0009 to 0015, FIG. 5, FIG. 6, FIG. 10)). The directivity switching antenna is composed of a plurality of antenna elements and phase devices respectively corresponding to the antenna elements. The phases of signals respectively received by the antenna elements are controlled by the phase devices and synthesized to electrically vary the directivity. For instance, in a smart antenna as one example of the directivity switching antenna, the directivity is switched to 16 directions in the periphery, which is specified by a standard. The broadcast receiver controls such a directivity switching antenna to switch the directive direction of the antenna to a prescribed direction so that the broadcast receiver receives the airwave of a prescribed channel transmitted from a prescribed broadcasting station. Thus, even when the directivity switching antenna is fixed to the roof of the residence, the user can receive substantially all of the broadcasting transmitted from a plurality of dotted broadcasting stations.

In the above-described broadcast receiver, when a desired channel is set as a receiving channel, the user operates an operating unit such as a remote controller or a switch to select one desired channel, and then operates the operating unit to switch the directive direction of the directivity switching antenna. Specifically, a control unit of the broadcast receiver switches the directive direction of the directivity switching antenna in accordance with an operating instruction of the user. At this time, the control unit processes the airwave received by the directivity switching antenna to display an image on, for instance, a television receiver (refer it to as a TV set, hereinafter.). Further, the control unit may sometimes display a character showing the current directive direction of the directivity switching antenna on the TV set (see JP-A-6-334931). While the user watches the TV set, the user operates the operating unit so as to display the best image and switches the directive direction of the directivity switching antenna. Then, when the directive direction of the directivity switching antenna in which the best image is displayed can be specified, the user performs a prescribed operation by the operating unit to set the receiving channel and the specified directive direction of the directivity switching antenna to the broadcast receiver. Thus, the control unit stores channel information showing the selected channel and direction information showing the directive direction of the directivity switching antenna at this time in a memory. When the receiving channel is set as described above, then, if the user operates the operating unit to select the set channel again, the control unit can read the direction information of the directivity switching antenna corresponding to the channel from the memory and switch the directivity of the directivity switching antenna to a direction shown by the direction information. Therefore, the broadcasting of the selected channel can be immediately received by the directivity switching antenna and the best image of the broadcasting is reproduced (displayed) on the TV set so that the user can immediately look at and listen to the TV set.

Further, there is a broadcast receiver that automatically determines the directive direction of a directivity switching antenna so that the level of the received electric power of a prescribed channel becomes maximum (see JP-A-11-298226). In this broadcast receiver, when a user selects a desired channel, a control unit controls the directivity of the directivity switching antenna to scan in an omni-direction, searches the direction of the maximum level of the received electric power and holds the directivity of the directivity switching antenna in that direction. Therefore, even when the user does not operate an operating unit to switch the directive direction of the directivity switching antenna, the broadcasting of the selected channel is received by the directivity switching antenna and the best image of the broadcasting is reproduced on a TV set so that the user can look at and listen to the TV set.

Some broadcasting stations broadcast only for a limited time, for instance, the broadcasting is performed during the daytime, however, the broadcasting is not performed during the night, among a plurality of broadcasting stations. When a channel that meets the broadcasting of the broadcasting station is set as a receiving channel in a usual broadcast receiver, if the channel is set to a time during which the broadcasting is carried out, a user can switch the directive direction of a directivity switching antenna to specify the directive direction in which the broadcasting can be most preferably received. However, when the channel is set to a time during which the broadcasting is not carried out, even if the user switches the directive direction of the directivity switching antenna, the user cannot receive the broadcasting itself. Thus, the directive direction in which the broadcasting can be most preferably received cannot be specified. Therefore, when the user tries to set the channel to the time during which the broadcasting is not carried out from a reason why the time during which the broadcasting is carried out is unclear, the user needs to recognize that the direction in which the broadcasting can be most preferably received cannot be specified, then, to select a suitable directive direction and to store channel information and direction information showing the selected directive direction in a memory. Thus, it takes undesirably much time to set the channel. Further, when the user suitably sets the channel as described above, the user subsequently selects the channel. At this time, even when a control unit reads the direction information corresponding to the channel from the memory and switches the directivity of the directivity switching antenna to the direction shown by the direction information, the broadcasting of the channel cannot be most preferably received. Accordingly, when the user tries to look at and listen to the broadcasting of the channel in a most preferable state, the control unit is restricted by the direction information stored in the memory. After the control unit firstly switches the directive direction of the directivity switching antenna to the direction shown by the direction information, the user undesirably needs to recognize that the switched direction is not a direction in which the broadcasting can be most preferably received. Further, while the user switches the directive direction of the directivity switching antenna, the user needs to search the direction for most preferably receive the broadcasting. Thus, it takes inconveniently much time to look at and listen to the broadcasting in the most preferable way.

On the other hand, the influence of an interfering radio wave flying about in the periphery is different owing to a receiving place, for instance, the influence of the interfering radio wave is weak during the daytime, but strong during the night depending on time. Accordingly, the directive direction of the directivity switching antenna in which the broadcasting of the prescribed channel can be most preferably received may be different depending on time. In such a receiving place, when the channel is set as the receiving channel in the usual broadcast receiver, the user subsequently selects the channel. At this time, even when the control unit reads the direction information corresponding to the channel from the memory to switch the directivity of the directivity switching antenna to the direction shown by the direction information, the broadcasting of the channel can be most preferably received for a certain time, however, the broadcasting of the channel cannot be most preferably received for another time. Accordingly, when the user tries to look at and listen to the broadcasting of the channel in a most preferable state for the different time, the control unit is restricted by the direction information of the memory as described above and firstly switches the directive direction of the directivity switching antenna. Then, the user needs to switch the directive direction and search the direction for most preferably receiving the broadcasting. Thus, it takes undesirably much time.

The present invention overcomes the above-described problems and it is an object of the present invention to provide a broadcast receiver that can reduce a time necessary for setting a channel and a time necessary until the broadcasting of the set channel can be looked at and listen to in a most preferable state.

SUMMARY OF THE INVENTION

The present invention provides a broadcast receiver for receiving a broadcasting of a prescribed channel transmitted from a broadcasting station by a directivity switching antenna capable of switching directivity to a plurality of preset directions. The broadcast receiver includes: a control unit for controlling the directivity switching antenna to switch a directive direction; a memory for storing channel information showing the prescribed channel and direction information showing the directive direction of the directivity switching antenna; and an instructing unit for allowing a user to instruct the prescribed channel to be set as a receiving channel. When the instructing unit instructs the user to set the prescribed channel as the receiving channel, the control unit stores only the channel information of the prescribed channel in the memory.

In such a way, since only the channel information of the prescribed channel is stored in the memory and the prescribed channel is set as the receiving channel, irrespective of whether or not the directive direction of the directivity switching antenna in which the broadcasting of the prescribed channel can be most preferably received can be specified, a time required for setting the channel can be shortened. Then, when the prescribed channel is set as described above, the prescribed channel is subsequently selected. At this time, since the direction information of the directivity switching antenna corresponding to the prescribed channel is not stored in the memory, while the directive direction of the directivity switching antenna is immediately switched, the direction in which the broadcasting of the prescribed channel can be most preferably received can be searched without being restricted by the information stored in the memory. Further, a time required until the broadcasting can be looked at and listened to in a most preferable state can be shortened.

Further, according to the present invention, a broadcast receiver is provided for receiving a broadcasting of a prescribed channel transmitted from a broadcasting station by a directivity switching antenna capable of switching directivity to a plurality of preset directions. The broadcast receiver includes: a control unit for controlling the directivity switching antenna to switch a directive direction; a memory for storing channel information showing the prescribed channel and direction information showing the directive direction of the directivity switching antenna; an instructing unit for allowing a user to instruct the prescribed channel to be set as a receiving channel; and an inquiring and instructing unit for allowing the user to inquire and instruct whether or not the direction information of the directivity switching antenna is stored. When the instructing unit instructs the user to set the prescribed channel as the receiving channel and the inquiring and instructing unit instructs the user to store the direction information of the directivity switching antenna, the control unit correlates the channel information of the prescribed channel with the direction information of the directivity switching antenna to store the correlated information in the memory. When the instructing unit instructs the user to set the prescribed channel as the receiving channel and the inquiring and instructing unit instructs the user not to store the direction information of the directivity switching antenna, the control unit stores only the channel information of the prescribed channel in the memory.

In such a way, since the user can instruct whether or not the direction information of the directivity switching antenna is stored, when the prescribed channel is set as the receiving channel, if the directive direction in which the broadcasting of the prescribed channel can be most preferably received can be specified, the direction information is instructed to be stored. Thus, the channel information of the prescribed channel can be correlated with the direction information showing the specified directive direction to store the correlated information in the memory and the prescribed channel can be set. Then, when the prescribed channel is set as described above, the prescribed channel is subsequently selected. At this time, since the direction information corresponding to the prescribed channel is stored in the memory, the directive direction of the directivity switching antenna is switched to the direction shown by the direction information. Thus, the broadcasting of the prescribed channel can be immediately received in a most preferable way and a time required until the broadcasting can be looked at and listened to in a most preferable state can be shortened. On the other hand, when the prescribed channel is set as the receiving channel, if the directive direction in which the broadcasting of the prescribed channel can be most preferably received cannot be specified, the direction information is instructed not to be stored. Thus, only the channel information of the prescribed channel is stored in the memory so that the prescribed channel can be set as the receiving channel and the time required until the prescribed channel is set as the receiving channel can be shortened. Then, when the prescribed channel is set as described above, the prescribed channel is subsequently selected. At this time, since the direction information of the directivity switching antenna corresponding to the prescribed channel is not stored in the memory, while the directive direction of the directivity switching antenna is immediately switched, the direction in which the broadcasting of the prescribed channel can be most preferably received can be searched without being restricted by the information stored in the memory. Further, a time required until the broadcasting can be looked at and listened to in a most preferable state can be shortened.

Further, in one embodiment of the present invention, when the inquiring and instructing unit instructs the user to store the direction information, the control unit correlates the direction information showing the directive direction to which the directivity switching antenna is directed with the channel information to store the correlated information in the memory.

In such away, the direction information can be stored at a timing desired by the user. Accordingly, before the directive direction in which the broadcasting of the prescribed channel can be most preferably received is specified, the user can correlate the direction information with the channel information and store the correlated information. Thus, the time necessary for setting the desired channel can be shortened.

Further, in one embodiment of the present invention, while the control unit controls the directive direction of the directivity switching antenna to be switched to an omni-direction, the control unit controls the directivity switching antenna to receive the broadcasting of the prescribed channel and controls a reproducing unit to reproduce the received broadcasting at any time. When the direction in which the broadcasting of the prescribed channel can be most preferably received can be specified, the control unit holds the directive direction of the directivity switching antenna in the direction.

In such a way, the directive direction of the directivity switching antenna is automatically switched and the direction in which the broadcasting of the prescribed channel can be most preferably received is specified. Accordingly, a labor necessary for the user who switches the directive direction of the directivity switching antenna to specify the direction in which the broadcasting can be most preferably received can be saved. Thus, a time required for specifying the direction in which the broadcasting can be most preferably received can be more shortened than that required by the user. Further, since the reproducing unit is allowed to reproduce the broadcasting received by the directivity switching antenna at any time, the user can recognize the reproducing state of the broadcasting of the prescribed channel from the reproducing state to grasp whether or not the direction in which the broadcasting can be most preferably received can be specified. Therefore, the user can readily decide whether or not the direction information of the directivity switching antenna is stored and can easily designate the directive direction to be stored. Thus, a time required for setting the prescribed channel can be more shortened. Further, only the channel information of the prescribed channel is stored in the memory to set the prescribed channel. In this case, when the prescribed channel is subsequently selected, while the directive direction of the directivity switching antenna is immediately and automatically switched, the direction in which the broadcasting of the prescribed channel can be most preferably received can be searched. Thus, a time necessary until the broadcasting of the prescribed channel can be looked at and listened to in a most preferable state can be more shortened.

Further, in one embodiment of the present invention, the control unit controls a display unit to display the directive direction to which the directivity switching antenna is directed at any time.

In such a way, the user can recognize the directive direction to which the directivity switching antenna is actually directed and can grasp whether or not the direction in which the broadcasting of the prescribed channel can be most preferably received can be specified on the basis of whether or not the displayed directive direction is secured to one direction. Therefore, the user can readily decide whether or not the direction information of the directivity switching antenna is stored and can easily designate the directive direction to be stored. Thus, a time required for setting the prescribed channel can be more shortened.

Further, in one typical embodiment of the present invention, a broadcast receiver is provided for receiving a television broadcasting of a prescribed channel transmitted from a broadcasting station by a smart antenna capable of switching directivity to a plurality of preset directions. The broadcast receiver includes: a control unit for controlling the smart antenna to switch a directive direction; a memory for storing channel information showing the prescribed channel and direction information showing the directive direction of the smart antenna; an instructing unit for allowing a user to instruct the prescribed channel to be set as a receiving channel; and an inquiring and instructing unit for allowing the user to inquire and instruct whether or not the direction information of the smart antenna is stored. In this structure, while the control unit controls the directive direction of the smart antenna to be switched to an omni-direction, the control unit controls the smart antenna to receive the broadcasting of the prescribed channel and controls a television receiver to display an image of the received broadcasting and the directive direction to which the smart antenna is directed at any time. When a direction in which the broadcasting of the prescribed channel can be most preferably received can be specified, the control unit holds the directive direction of the smart antenna in the direction. Then, when the instructing unit instructs the user to set the prescribed channel as the receiving channel and the inquiring and instructing unit instructs the user to store the direction information of the smart antenna, the control unit correlates the channel information of the prescribed channel with the direction information showing the directive direction to which the smart antenna is directed when the user is instructed to store the direction information to thus store the correlated information in the memory. When the instructing unit instructs the user to set the prescribed channel as the receiving channel and the inquiring and instructing unit instructs the user not to store the direction information of the smart antenna, the control unit stores only the channel information of the prescribed channel in the memory.

In such a way, since the user can instruct whether or not the direction information of the smart antenna is stored, when the prescribed channel is set as the receiving channel, if the directive direction in which the broadcasting of the prescribed channel can be most preferably received is specified, the direction information is instructed to be stored. Thus, the channel information of the prescribed channel can be correlated with the direction information showing the specified directive direction to store the correlated information in the memory so that the prescribed channel can be set. Then, when the prescribed channel is set as described above, the prescribed channel is subsequently selected. At this time, since the direction information corresponding to the prescribed channel is stored in the memory, the directive direction of the smart antenna is switched to the direction shown by the direction information. Thus, the broadcasting of the prescribed channel can be immediately received in a most preferable way and a time required until the broadcasting can be looked at and listened to in a most preferable state can be shortened. On the other hand, when the prescribed channel is set as the receiving channel, if the directive direction in which the broadcasting of the prescribed channel can be most preferably received cannot be specified, the direction information is instructed not to be stored. Thus, only the channel information of the prescribed channel is stored in the memory so that the prescribed channel can be set as the receiving channel and the time required until the prescribed channel is set as the receiving channel can be shortened. Then, when the prescribed channel is set as described above, the prescribed channel is subsequently selected. At this time, since the direction information corresponding to the prescribed channel is not stored in the memory, while the directive direction of the smart antenna is immediately switched, the direction in which the broadcasting of the prescribed channel can be most preferably received can be searched without being restricted by the information stored in the memory. Further, a time required until the broadcasting can be looked at and listened to in a most preferable state can be shortened.

According to the present invention, since only the channel information of the prescribed channel is stored in the memory and the prescribed channel is set as the receiving channel, the time required for setting the prescribed channel as the receiving channel can be shortened. Then, when the set prescribed channel is subsequently selected, since the direction information of the directivity switching antenna corresponding to the prescribed channel is not stored in the memory, while the directive direction of the directivity switching antenna is immediately switched, the direction in which the broadcasting of the prescribed channel can be most preferably received can be searched without being restricted by the information stored in the memory. Further, a time required until the broadcasting can be looked at and listened to in a most preferable state can be shortened.

DETAILED DESCRIPTION OF THE INVENTION

Figure 1:
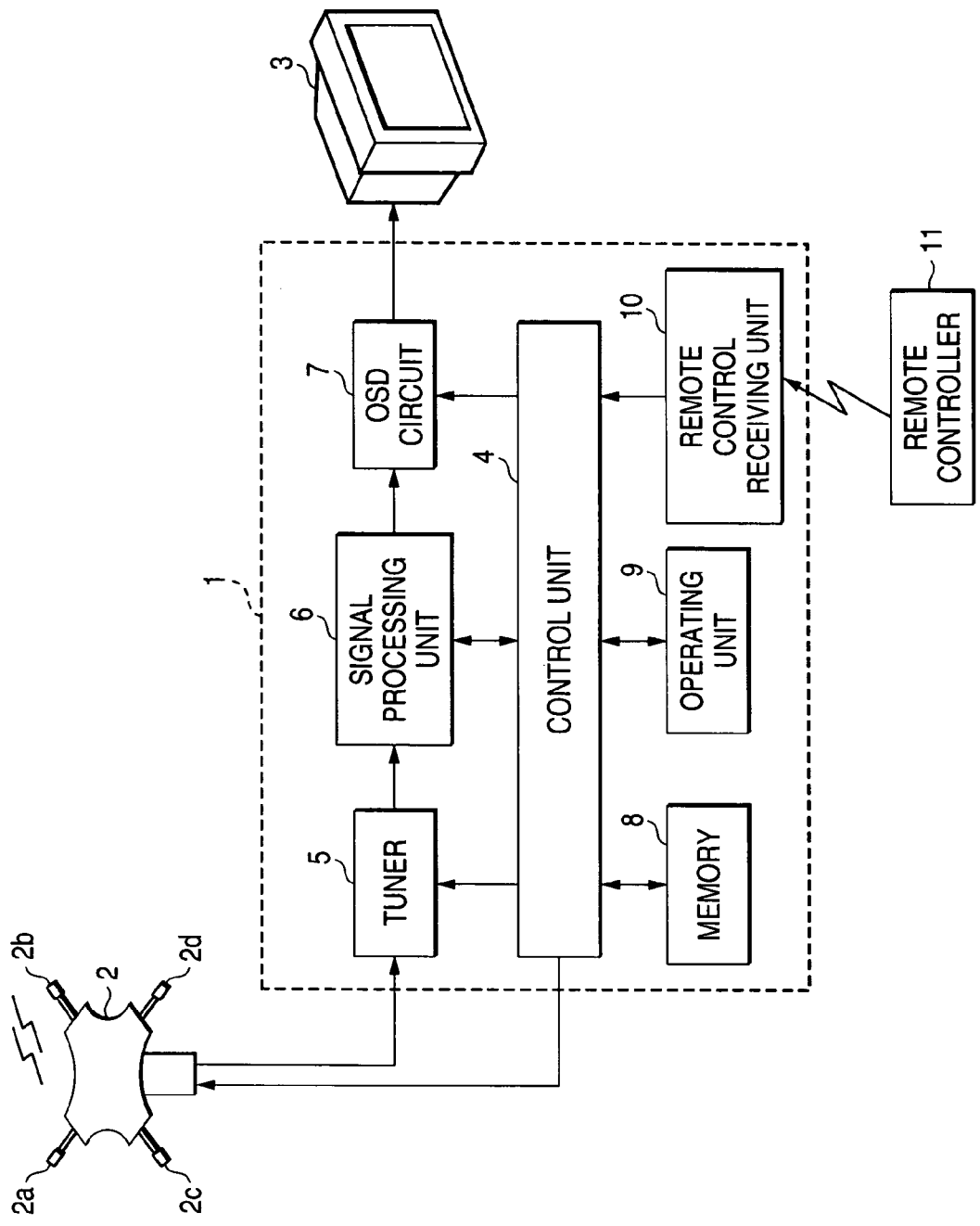
FIG. 1 is a block diagram showing a receiving system of a television broadcasting.

FIG. 1 is a block diagram showing a receiving system of a television broadcasting. In FIG. 1, reference numeral 1 designates a broadcast receiver. 2 designates a smart antenna. 3 designates a television receiver (refer it to as a TV set, hereinafter.). The broadcast receiver 1 and the TV set 3 are installed in a residence of an ordinary home and connected together by a cable. The smart antenna 2 is attached and fixed to the roof or the veranda of the residence and connected to the broadcast receiver 1 by a cable. The smart antenna 2 includes four antenna elements 2a to 2d, phase devices respectively provided correspondingly to the antenna elements 2a to 2d, a synthesizing device and a control circuit (illustrations are respectively omitted except the antenna elements 2a to 2d). The phases of signals respectively received by the antenna elements 2a to 2d are controlled by the phase devices. The signals whose phases are controlled are synthesized by the synthesizing device so that directivity is electrically switched to 16 directions.

Figures 2, 3:
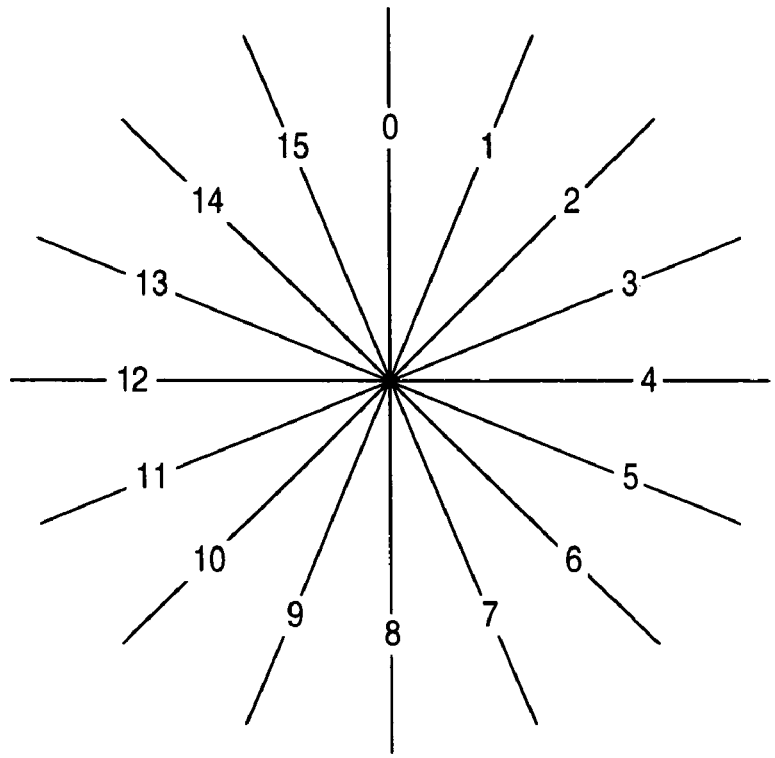
FIG. 2 is a diagram showing the directive direction of a smart antenna.
FIG. 3 is a diagram showing one example of the contents of storage of a memory provided in a broadcast receiver.

FIG. 2 is a diagram showing the directive direction of the smart antenna 2. In FIG. 2, straight lines respective show the directive directions to which the smart antenna 2 is switched. Apart at which the straight lines respectively intersect shows a center of the smart antenna 2. Numbers 0 to 15 respectively show the directive directions. That is, the smart antenna 2 switches the directivity to directions respectively obtained by dividing the periphery of 360° into 16. The broadcast receiver 1 controls the smart antenna 2 to switch the directive direction of the smart antenna 2 so that television airwaves transmitted from a plurality of broadcasting stations dotted in the periphery of the residence are received.

Figure 4:
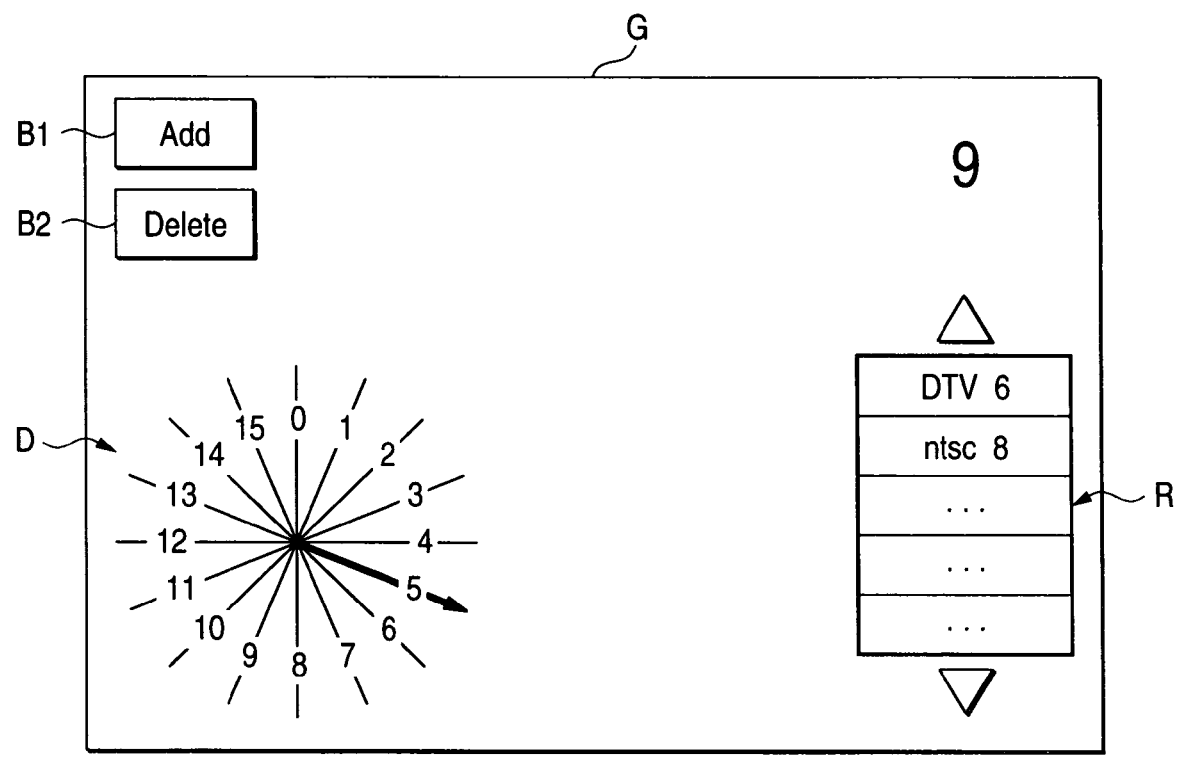
FIG. 4 is a diagram showing one example of a display screen of a TV set.

Reference numeral 4 in FIG. 1 designates a control unit composed of a CPU, a ROM or a RAM. In the ROM of the control unit 4, a controlling program and data are stored. In the RAM, controlling data is stored to be read and written. The control unit 4 controls the respective parts of the broadcast receiver 1 and controls the directive direction of the smart antenna 2 to be switched. Reference numeral 5 designates a tuner. 6 designates a signal processing unit. 7 designates an OSD circuit. The tuner 5 extracts a television broadcasting signal of a prescribed channel from the television airwave received by the smart antenna 2. The signal processing unit 6 processes the television broadcasting signal outputted from the tuner 5 to generate a video signal and an audio signal and output the generated video signal and the audio signal to the TV set 3. The OSD circuit 7 processes and outputs image data outputted from the control unit 4 so as to be displayed on the TV set 3 as an OSD (on screen display). The TV set 3 processes the video signal and the audio signal outputted from the signal processing unit 6 to display and reproduce an image on a monitor and output and reproduce sound from a speaker. Further, the TV set 3 processes the image data outputted from the OSD circuit 7 to display an image on the monitor as an OSD. In the image to be displayed, the diagram showing the directive directions of the smart antenna 2 in FIG. 2 is included (for instance, as shown in FIG. 4).

Reference numeral 8 designates a nonvolatile memory. The control unit 4 stores channel information showing the prescribed channel and direction information showing the directive direction of the smart antenna 2 in a prescribed area of the memory 8, as described below. Reference numeral 9 designates an operation unit including various kinds of keys such as channel keys or a power key or the like. 10 designates a remote-controlled reception unit to receive a signal from a remote controller 11. In the remote controller 11, various keys such as channel keys, a menu key and a cross key or the like are provided.

In the above-described structure, the broadcast receiver 1 forms one example of a broadcast receiver in the present invention. The smart antenna 2 forms one example of a directivity switching antenna in the present invention. The TV set 3 forms one example of a reproducing unit and a display unit in the present invention. The control unit 4 forms one example of a control unit in the present invention. The memory 8 forms one example of a memory in the present invention.

In the above-described structure, when a user initially connects the broadcast receiver 1 to the smart antenna 2 and turns on a power, or when the user performs a prescribed operation by the above-described remote controller 11, the control unit 4 performs an automatic scanning process. The automatic scanning process means a process that all channels capable receiving an airwave are automatically scanned (searched) to set a channel as a receiving channel. When the control unit 4 starts the automatic scanning process, the control unit selects one channel from among channels (for instance, a channel 2 to a channel 69) as receiving candidates that are previously stored in the ROM and informs the smart antenna 2 of the channel number of the selected channel. When the smart antenna 2 receives the information of the channel number, the smart antenna sets parts respectively so as to receive the radio wave of a frequency band corresponding to the channel number.

After the smart antenna 2 is informed of the channel number, the control unit 4 transmits to the smart antenna 2 a control signal that instructs the directive direction to be switched to any of the directions of 0 to 15 at prescribed cycles. While the control unit 4 controls the smart antenna 2 to switch the directive direction to all directions in a prescribed sequence, the control unit controls the smart antenna to receive the airwave of the selected channel. The directive direction is switched in order from, for instance, the direction of the smaller numbers (a clockwise order from the direction of "0" in FIG. 2). At this time, every time the smart antenna 2 receives the airwave, the control unit 4 detects the receiving level of the airwave and temporarily stores in the RAM the receiving level together with direction information showing the directive direction of the smart antenna 2 upon receiving the airwave. The receiving level of the airwave means the intensity of a received electric power in the case of an analog airwave, and a bit error rate in the case of a digital airwave.

Then, after the control unit 4 controls the directive direction of the smart antenna 2 to be switched to all the directions or an omni-direction, the control unit 4 specifies a directive direction in which the receiving level is most preferable, that is, the directive direction in which the airwave can be most preferably received on the basis of the contents of storage of the RAM. Specifically, in the case of the analog airwave, a direction in which the intensity of the received electric power is in a prescribed level or higher and maximum is specified as the directive direction in which the airwave can be most preferably received. In the case of the digital airwave, a direction in which the bit error rate is in a prescribed level or lower and minimum is specified as the directive direction in which the airwave can be most preferably received. Here, when the directive direction in which the airwave can be most preferably received can be specified, the control unit 4 correlates the channel information of the selected channel with the direction information showing the specified directive direction to store the correlated information in the prescribed area of the memory 8. Thus, the selected channel is set. On the other hand, when the smart antennas 2 does not receive the airwave, or when the smart antenna receives the airwave, however, the intensity of the received electric power is lower than the prescribed level, or when the bit error rate does not exceed the prescribed level so that the directive direction in which the airwave can be most preferably received cannot be specified, the control unit 4 does not store any data in the prescribed area of the memory 8. Thus, the control unit 4 abandons to set the selected channel.

After the control unit 4 sets the selected channel or abandons to set the selected channel, the control unit 4 selects another channel from among the channels as the receiving candidates and repeatedly performs the same procedure as described above. Then, when the control unit 4 repeatedly performs the same procedure as described above for all the channels as the receiving candidates and completes the automatic scanning process, a channel setting table T as shown in FIG. 3 is prepared in the prescribed area of the memory 8. In a left side, the channel information is stored. In a right side, the direction information of the smart antenna 2 correlated with the channel information respectively is stored. In the channel information, information such as the channel numbers (2, 4, 6, 69, etc.), a classification of an analog broadcasting (ntsc) or a digital broadcasting (DTV), a classification of a VHF band or a UHF band, etc. is included. In the direction information of the smart antenna 2, information such as the direction numbers showing the directive directions (14, 1, 3, 10, etc.), the receiving level (LEV**) of the airwaves received in the directions, etc. is included.

The preparation of the channel setting table T means that all the radio waves transmitted from a plurality of broadcasting stations dotted in the periphery of the residence are substantially received and the directive direction of the smart antenna in which the airwave can be received can be set for each of the channel numbers. Accordingly, when the user operates the remote controller 11 to select one of the set channels, the control unit 4 reads the direction information of the smart antenna 2 corresponding to the selected channel from the table T to switch the directive direction of the smart antenna 2 to a direction shown by the direction information. Thus, the airwave of the channel can be immediately and most preferably received. Then, the control unit 4 can process the received airwave to immediately and preferably display the image on the TV set 3 and output the sound. Thus, in accordance with the channel setting table, the user can look at and listen to the broadcasting of the selected channel in short time and in a most preferable state.

FIG. 4 is a diagram showing one example of a screen displayed on the TV set 3. When the user operates the remote controller 11 in a prescribed procedure, the control unit 4 controls an ADD screen G on the TV set 3. B1 is an ADD button for instructing the user to set a desired channel as a receiving channel. When the user operates the remote controller 11 to press (designate) the ADD button B1, the control unit 4 performs a channel ADD process in accordance with a flowchart shown in FIG. 5 as described below. The ADD button B1 forms one embodiment of an instructing unit in the present invention. B2 is a DELETE button for instructing the user to cancel the setting of the desired channel as the receiving channel. When the user operates the remote controller 11 to press (designate) the DELETE button B2, the control unit 4 performs a channel DELETE process in accordance with a flowchart shown in FIG. 8 as described below. D is a direction view showing the directive direction of the smart antenna 2. In the direction view D, the directive direction to which the smart antenna 2 is directed is shown by a direction of a thick arrow mark at any time. The receiving level of the airwave received by the smart antenna 2 in that direction is displayed by the length of the thick arrow mark at any time. For instance, in the thick arrow mark shown in FIG. 4, since the smart antenna 2 is currently directed to the direction of the number "5" and the length is large, the thick arrow mark shows that the receiving level of the airwave is good. R designates a display column for displaying the numbers of the set channels. When the user operates the remote controller 11 to press triangular marks shown in the upper and lower parts of the display column R, the numbers of other set channels that are not currently displayed can be displayed on the display column R. On the right upper part of the ADD screen G, the number of the channel selected by the user is displayed. On the entire part of the ADD screen G shown by oblique lines, the image of the broadcasting received by the smart antenna 2 is displayed at any time. For instance, in FIG. 4, the user selects the channel of "9" and the image of the broadcasting of the channel "9" that is received by the smart antenna 2 in the directive direction of the number "5" is displayed on the entire part of the ADD screen G.

After the user operates the remote controller 11 to display the ADD screen G on the TV set 3, when the user operates the remote controller 11 to select the desired channel, the control unit 4 informs the smart antenna 2 of the number of the selected channel. Then, as described above in the automatic scanning process, while the control unit 4 controls the directive direction of the smart antenna 2 to be switched to all the directions or the omni-direction, the control unit 4 controls the smart antenna to receive the airwave of the selected channel. At this time, the control unit 4 processes the airwave received by the smart antenna 2 to display (reproduce) the image of the broadcasting in the ADD screen G at any time. Further, the control unit 4 controls the directive direction (the directive direction to which the control unit instructs the smart antenna 2 to be switched) to which the smart antenna 2 is currently directed to be displayed at any time by the thick arrow mark in the direction view D in the ADD screen G. Further, the control unit 4 detects the receiving level of the airwave received by the smart antenna 2 and temporarily stores the receiving level of the airwave together with the direction information showing the directive direction of the smart antenna 2 upon receiving the airwave in the RAM. Then, as described above, when the directive direction in which the airwave can be most preferably received can be specified on the basis of the contents of the storage of the RAM, the control unit 4 holds the directive direction of the smart antenna 2 in the specified direction. At this time, in the ADD screen G, the most preferable image of the broadcasting of the selected channel is displayed. In the direction view D, a thick arrow mark directed to one direction without varying the length is displayed. On the other hand, as described above, when the smart antenna 2 does not receive the airwave, or when the smart antenna 2 receives the airwave, however, the receiving level does not satisfy conditions so that the directive direction in which the airwave can be most preferably received cannot be specified, the control unit 4 subsequently controls the directive direction of the smart antenna 2 to be switched to all the directions or the omni-direction, the control unit 4 controls the smart antenna 2 to receive the airwave of the selected channel. At this time, in the ADD screen G, the image of the broadcasting of the selected channel is not displayed or the image is displayed in a seriously bad state. In the direction view D, a thick arrow mark whose length and instructing direction are varied at prescribed cycles is displayed.

Figure 5:
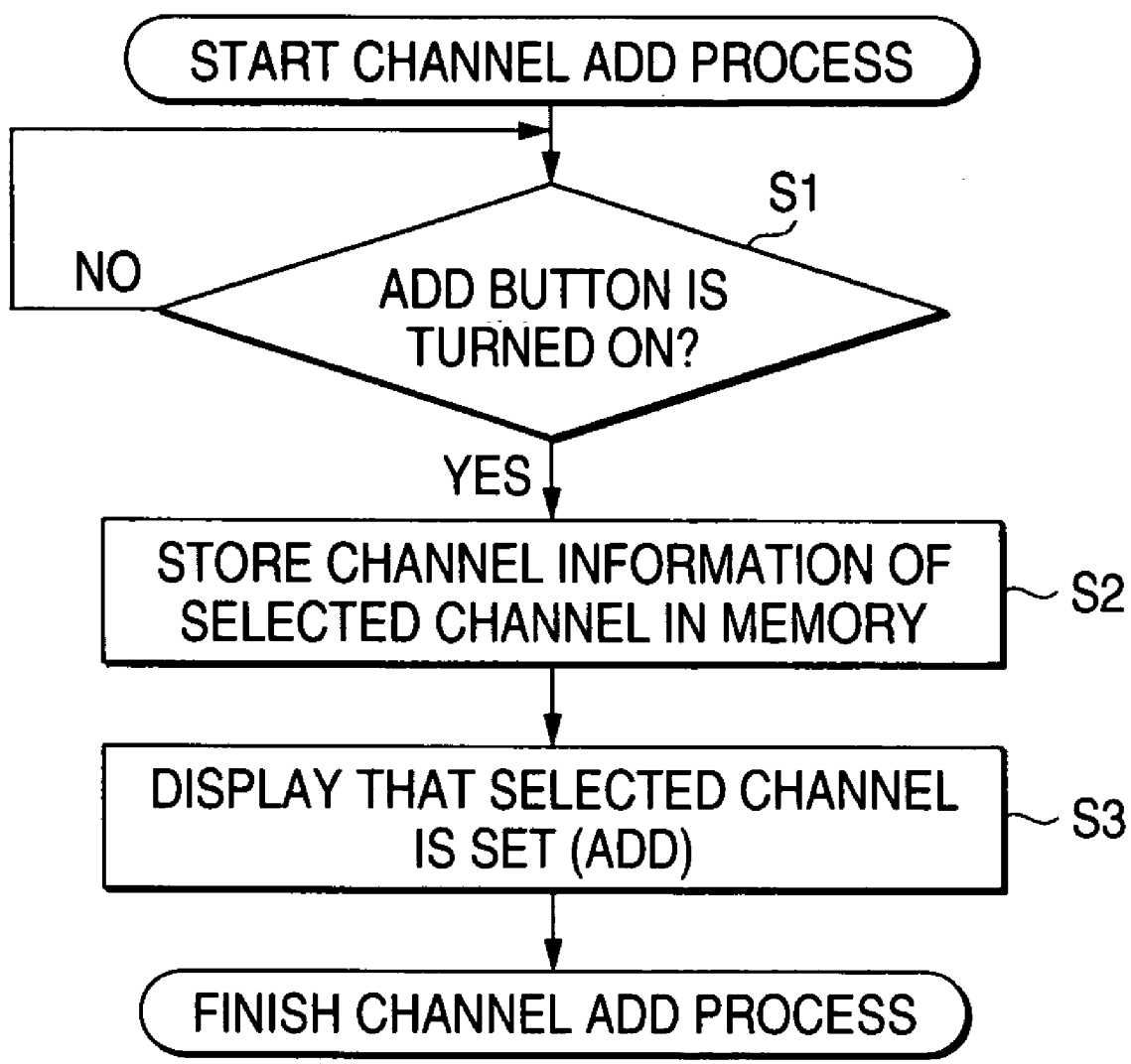
FIG. 5 is a flowchart of a channel ADD process.
Figure 6:
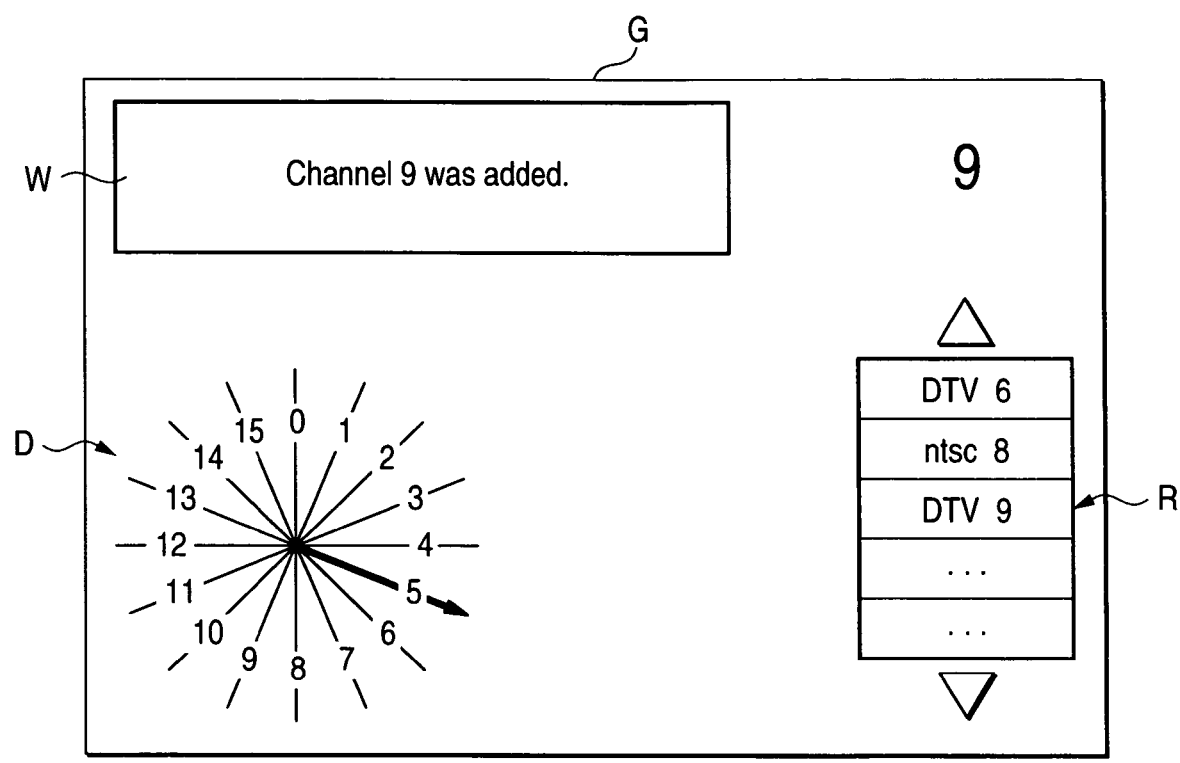
FIG. 6 is a diagram showing one example of a display screen of the TV set.
Figure 7:
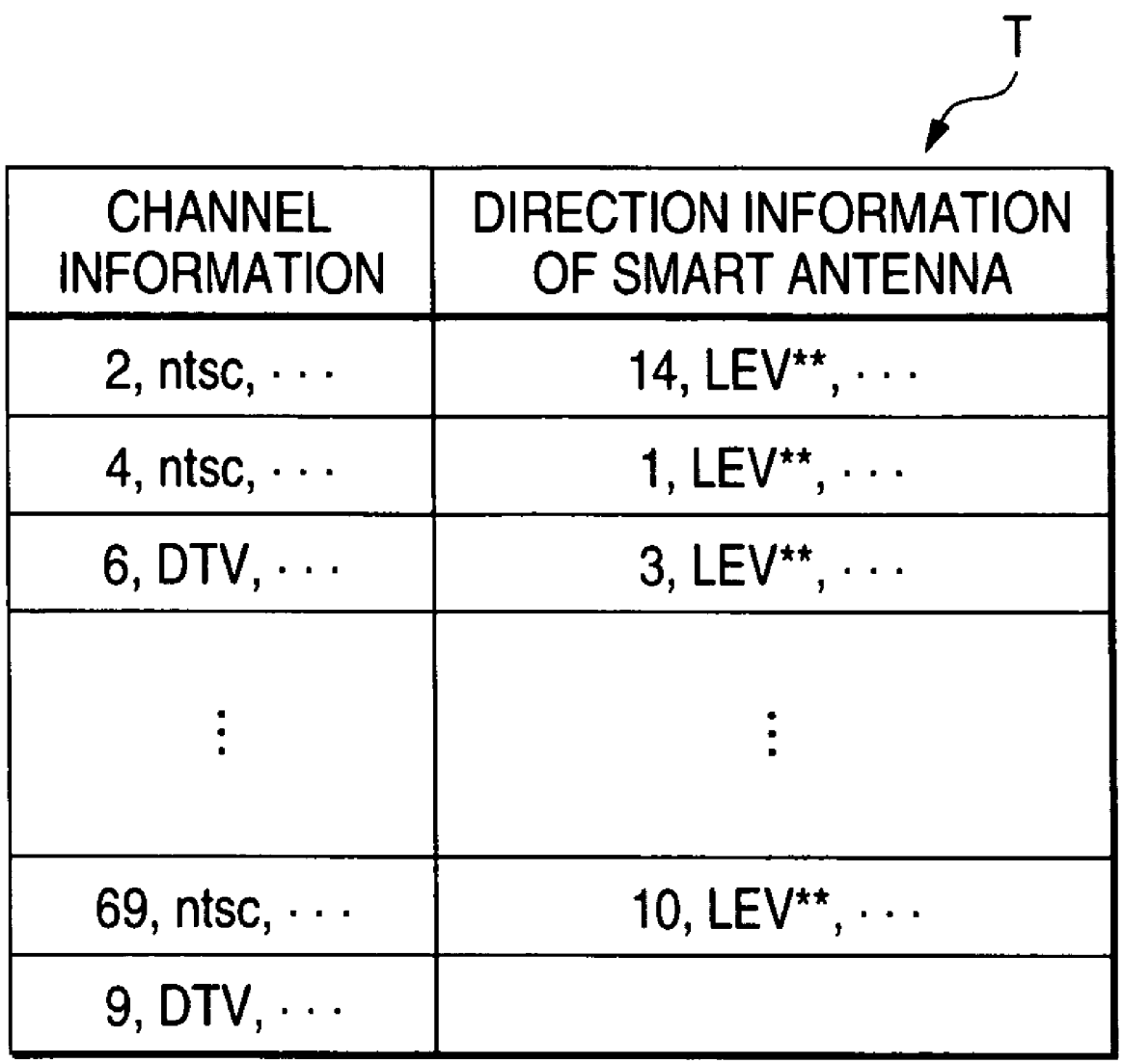
FIG. 7 is a diagram showing one example of the contents of storage of the memory provided in the broadcast receiver.

Subsequently, when the user operates the remote controller 11 to press the ADD button B1, the control unit 4 starts the channel ADD process shown in FIG. 5. In FIG. 5, when the control unit 4 recognizes that the ADD button B1 is pressed to be turned on (step S1: YES), the control unit stores the channel information of the channel (for instance, the channel of "9") selected by the user in the above-described channel setting table T of the memory 8 (step S2). After the control unit 4 stores the channel information, the control unit 4 displays a fact that the selected channel is set (added (ADD)) by a message window W in the ADD screen G as shown in FIG. 6 (step S3). At this time, the control unit 4 displays the number of the set channel "9" in the display column R. After a prescribed time passes, the control unit 4 deletes the message window W from the ADD screen G to display again the ADD button B1 and the DELETE button B2 and finishes the channel ADD process. Thus, in the channel setting table T of the memory 8, the channel information of the channel "9" selected by the user is newly stored as shown in FIG. 7 and the direction information showing the directive direction of the smart antenna 2 is not stored.

Figure 8:
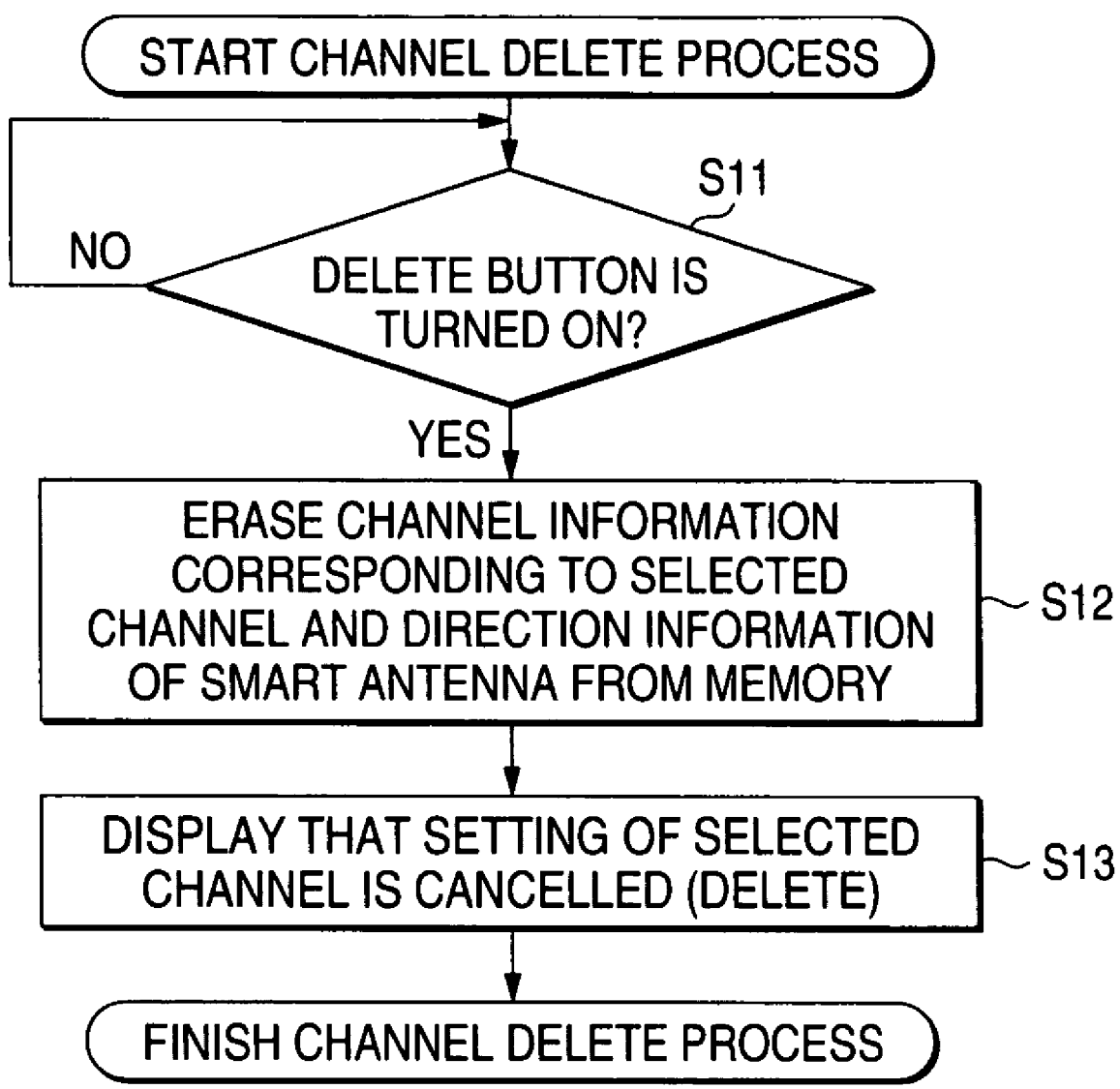
FIG. 8 is a flowchart of a channel DELETE process.
Figure 9:
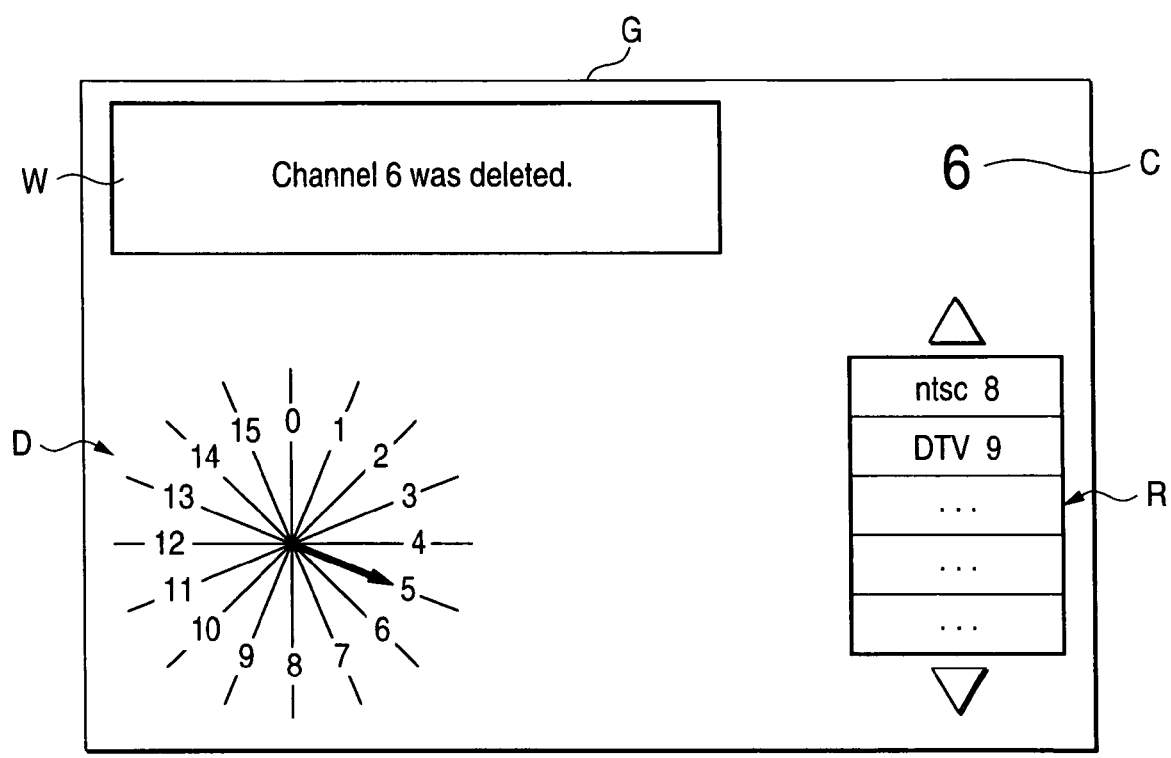
FIG. 9 is a diagram showing one example of the display screen of the TV set.
Figure 10:
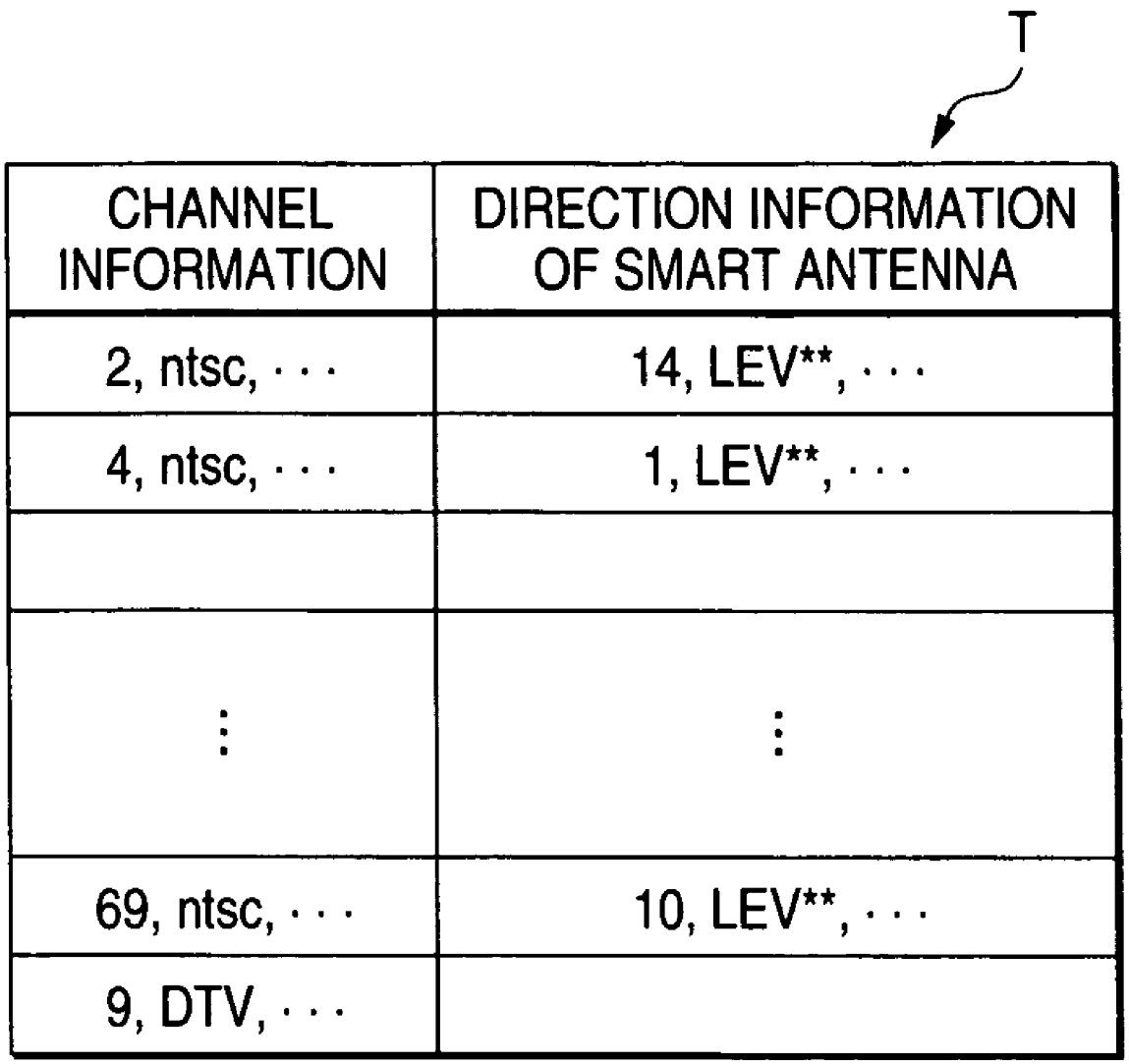
FIG. 10 is a diagram showing one example of the contents of storage of the memory provided in the broadcast receiver.

On the other hand, when the user operates the remote controller 11 to press the DELETE button B2, the control unit 4 performs the channel DELETE process shown in FIG. 8. In FIG. 8, when the control unit 4 recognizes that the DELETE button B2 is pressed to be turned on (step S11: YES), the control unit erases the channel information corresponding to the channel (for instance, the channel of "6") selected by the user and the direction information of the smart antenna 2 from the channel setting table T of the memory 8 (step S12). After the control unit 4 erases the information, the control unit 4 displays a fact that the setting of the selected channel is cancelled (deleted (DELETE)) by the message window W in the ADD screen G as shown in FIG. 9 (step S13). Further, at this time, the control unit 4 erases the number of the channel "6" whose setting is cancelled from the display column R. Then, when a prescribed time passes, the control unit 4 erases the message window W from the ADD screen G to display again the ADD button B1 and the DELETE button B2 and finishes the channel DELETE process. Thus, in the channel setting table T of the memory 8, as shown in FIG. 10, the channel information of the channel "6" selected by the user and the direction information are erased.

In the above-described channel ADD process shown in FIG. 5, only the channel information of the desired channel is stored in the channel setting table T of the memory 8 irrespective of whether or not the directive direction of the smart antenna 2 in which the broadcasting or the desired channel can be most preferably received can be specified and the desired channel is set as the receiving channel. Thus, a time necessary for setting the channel can be shortened. Then, when the desired channel is set in such away, the desired channel is subsequently selected. At this time, since the direction information of the smart antenna 2 corresponding to the desired channel is not stored in the channel setting table T, while the directive direction of the smart antenna 2 is immediately switched, the direction in which the broadcasting of the desired channel can be most preferably received can be searched without being restricted by the information stored in the channel setting table T. Thus, a time necessary until the broadcasting can be looked at and listened to in a most preferable state can be shortened.

Further, in the above-described channel DELETE process shown in FIG. 8, the setting of the set channel as the receiving channel can be cancelled. Accordingly, when the channel information and the direction information are stored in the channel setting table T in the automatic scanning process and the displayed state of the image of the broadcasting of the channel is deteriorated, the setting of the channel is cancelled by the channel DELETE process. Then, the channel is reset in the channel ADD process so that the direction information corresponding to the channel is not stored in the channel setting table T. Therefore, when the reset channel is subsequently selected, while the directive direction of the smart antenna 2 is immediately switched, the direction in which the broadcasting of the reset channel can be most preferably received can be searched without being restricted by the information stored in the channel setting table T. Thus, the time necessary until the broadcasting can be looked at and listened to in a most preferable state can be shortened.

Further, the control unit 4 automatically switches the directive direction of the smart antenna 2 to specify the direction in which the broadcasting of the selected channel can be most preferably received. Accordingly, a labor necessary for the user who switches the directive direction of the smart antenna 2 and specifies the direction in which the broadcasting can be most preferably received can be saved. Thus, the time necessary for specifying the direction can be more reduced than that required by the user. That is, a time necessary for setting the prescribed channel in the ADD screen G, a time necessary for canceling the setting and a time necessary for receiving the airwave of the channel set in the ADD screen G upon subsequently selecting the channel and reproducing the image of the broadcasting so as to be viewed can be more reduced.

Further, since the image of the broadcasting received by the smart antenna 2 is displayed in the ADD screen G at any time, the user can recognize the receiving state of the broadcasting of the selected channel from the displayed state of the image as reference information to grasp whether or not the direction in which the broadcasting can be most preferably received can be specified. Further, since the directive direction to which the smart antenna 2 is directed and the receiving level of the broadcasting are displayed by the thick arrow mark in the direction view D in the ADD screen G at any time. Thus, the user can recognize the directive direction to which the smart antenna 2 is actually directed and information as to whether or not the broadcasting is received in a stable manner in the direction as reference information. Accordingly, the user can grasp whether or not the direction in which the broadcasting of the desired channel can be most preferably received is specified.

Figure 11:
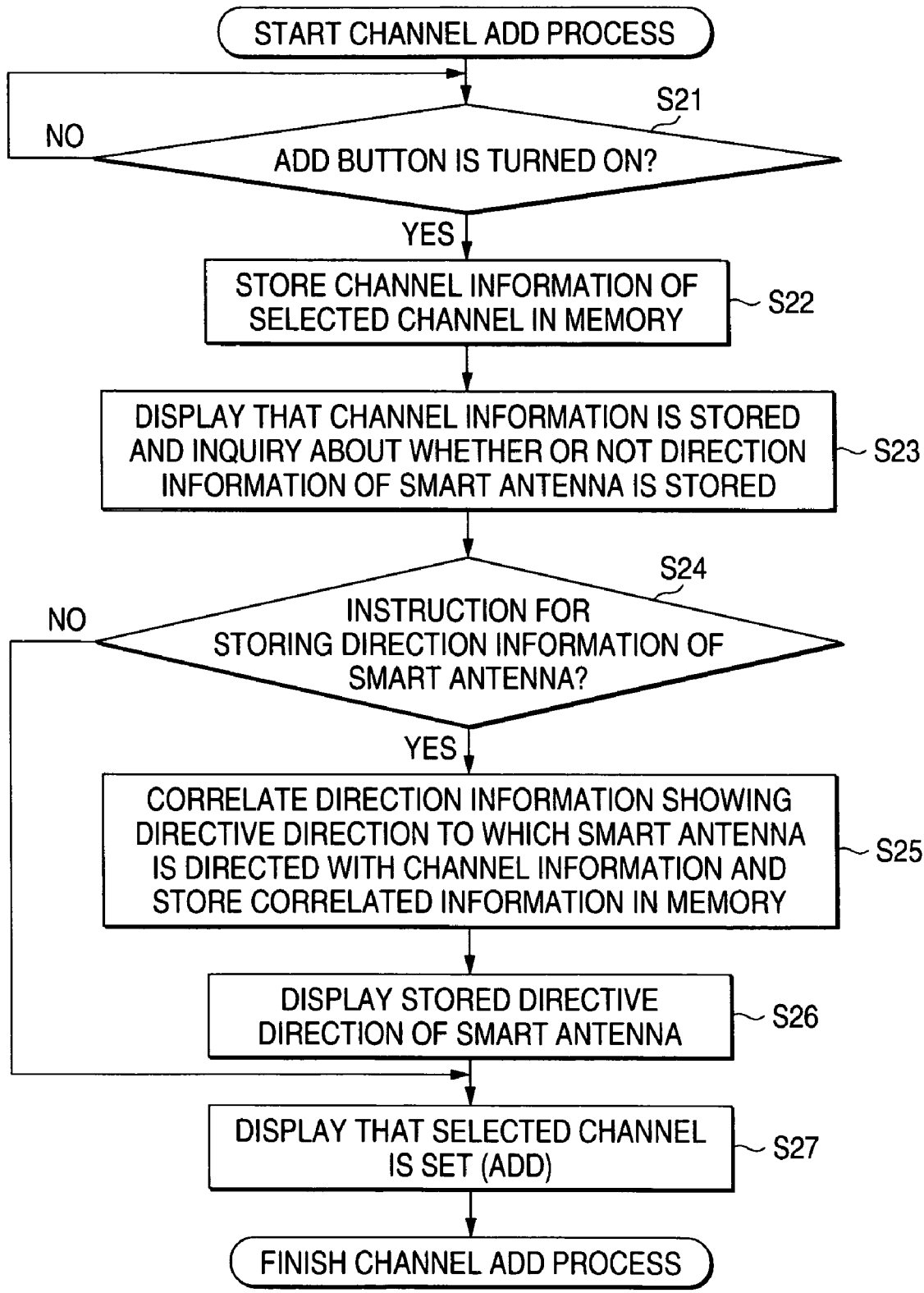
FIG. 11 is a flowchart of a channel ADD process in another embodiment.
Figure 12:
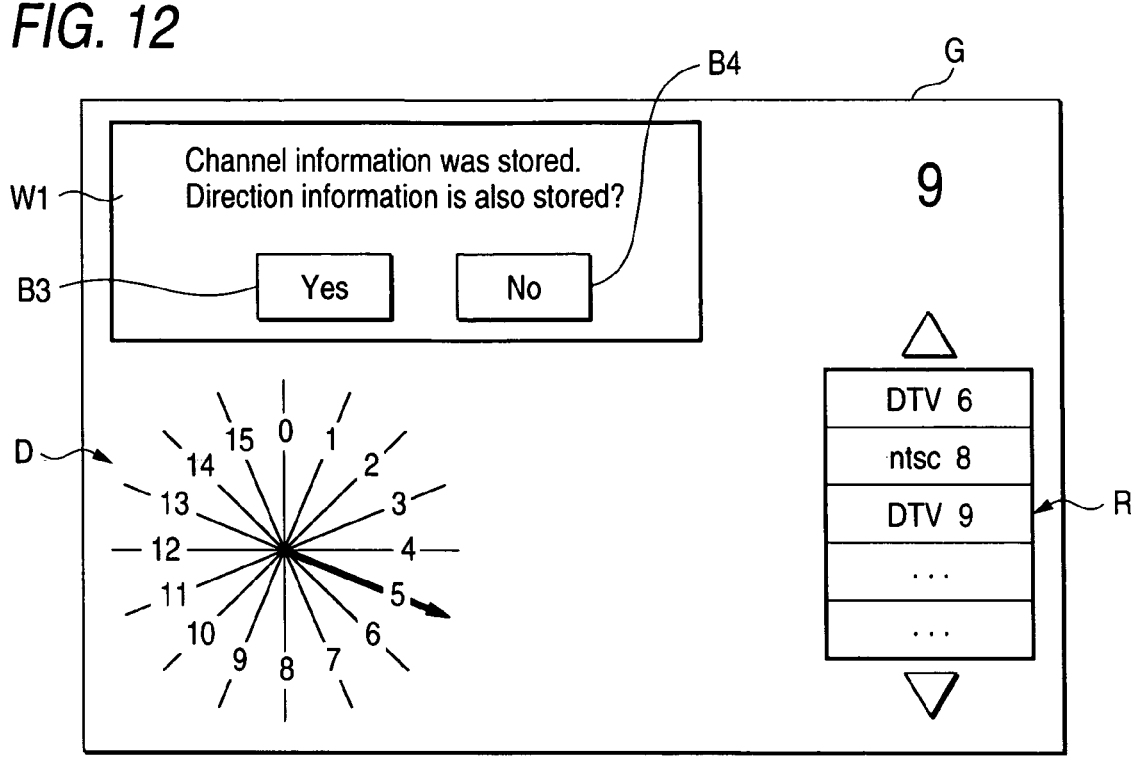
FIG. 12 is a diagram showing one example of a television display screen in another embodiment.
Figure 13:
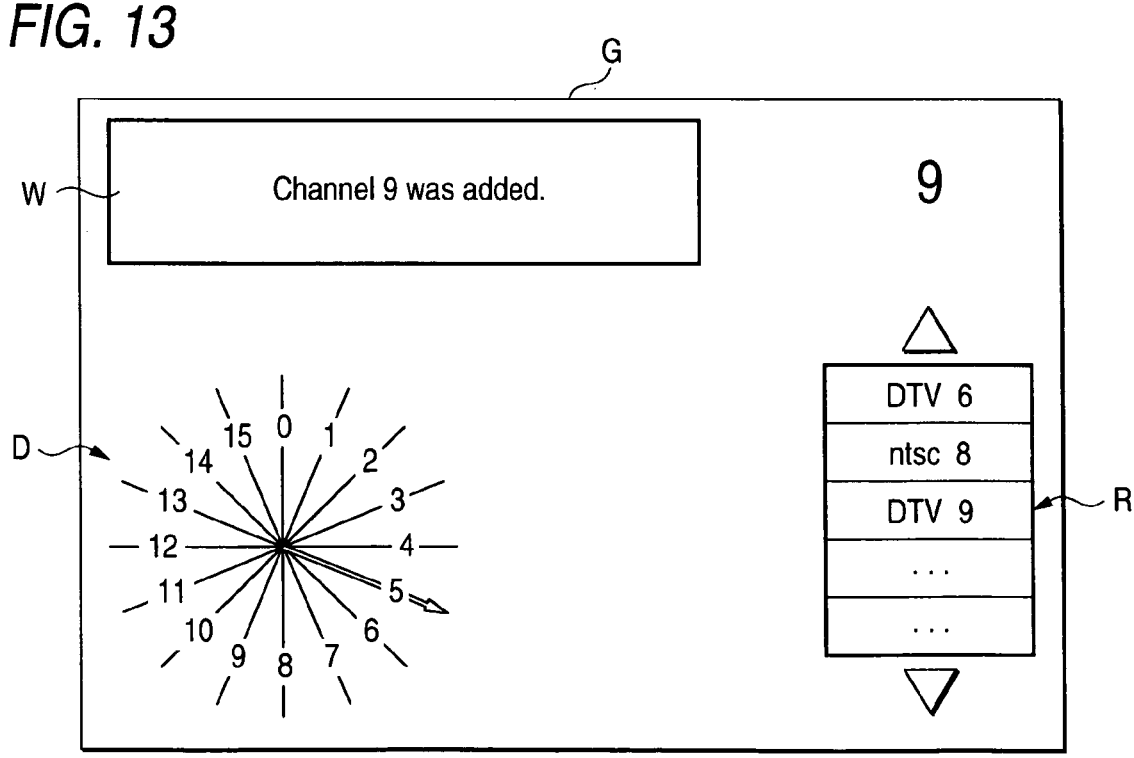
FIG. 13 is a diagram showing one example of the television display screen in another embodiment.

FIGS. 11 to 13 are diagrams showing another embodiment. In the ADD screen G shown in FIG. 4, when the user operates the remote controller 11 to press the ADD button B1, a control unit 4 in this embodiment starts a channel ADD process shown in FIG. 11. In FIG. 11, when the control unit 4 recognizes that the ADD button B1 is pressed to be turned on (step S21: YES), the control unit 4 stores the channel information of a channel (for instance, a channel of "9") selected by the user in the channel setting table T of a memory 8 (step S22). After the control unit 4 stores the channel information, the control unit 4 displays a fact that the channel information is stored and an inquiry as to whether or not the direction information of the smart antenna 2 is stored by an inquiry window W1 in the ADD screen G as shown in FIG. 12 (step S23). In the inquiry window W1, a "YES" button B3 that allows the user to instruct the direction information to be stored and a "NO" button B4 that allows the user to instruct the direction information not to be stored are displayed. The inquiry window W1 forms one example of an inquiring and instructing unit in the present invention.

When the inquiry window W1 is displayed, the user views the displayed state of an image in the ADD screen G or the varied state of a thick arrow mark in a direction view D to grasp whether or not a directive direction in which the broadcasting of the selected channel can be most preferably received is specified. Thus, the user decides whether or not the direction information of the smart antenna 2 is stored. Here, for instance, since the direction in which the broadcasting can be most preferably received is not specified, the user decides that the direction information of the smart antenna 2 is not stored to operate the remote controller 11 and press the "NO" button B4. In this case, the control unit 4 decides that there is not an instruction for storing the direction information (step S24:NO). Thus, the control unit displays a fact that the selected channel is set (ADD) in a message window w in the ADD screen G as shown in FIG. 6 (step S27). Further, at this time, the control unit 4 displays the number of the set channel "9" in a display column R. Then, after a prescribed time passes, the control unit 4 erases the message window W from the ADD screen G to display again the ADD button B1 and a DELETE button B2 and finishes the channel ADD process. Thus, only the channel information of the channel "9" selected by the user is newly stored in the channel setting table T of the memory 8.

On the other hand, in the step 24, for instance, since the direction in which the broadcasting can be most preferably received is specified, when the user decides that the direction information of the smart antenna 2 is stored to operate the remote controller 11 and press the "YES" button B3, the control unit 4 decides that there is an instruction for storing the direction information (step S24: YES). Then, the control unit 4 correlates the direction information showing the directive direction to which the smart antenna 2 at this time (when the "YES" button B3 is pressed) is directed with the channel information stored in the step S22 to store the correlated information in the channel setting table T of the memory 8 (step S25). When the control unit 4 stores the information in the memory, the control unit 4 displays the stored directive direction of the smart antenna 2 by an arrow mark in a direction view D in the ADD screen G as shown in FIG. 13 (step S26) and displays a fact that the selected channel is set (ADD) in the message window W in the ADD screen G (step S27). At this time, the control unit 4 displays the number of the channel "9" in the display column R. The arrow mark showing the stored directive direction is displayed in a different form, for instance, in a void arrow nark, from the thick arrow mark showing the directive direction to which the smart antenna 2 is currently directed as shown in FIG. 6. Further, in FIG. 13, since the stored directive direction corresponds to the directive direction to which the smart antenna is currently directed, only the arrow mark showing the stored directive direction is displayed in the direction view D. However, when both the directive directions do not correspond to each other, the arrow marks respectively showing the directive directions are displayed in the direction view D. Then, after a prescribed time passes, the control unit 4 erases the message window W from the ADD screen G to display again the ADD button B1 and a DELETE button B2 and finishes the channel ADD process. Thus, the channel information of the channel "9" selected by the user and the direction information showing the directive direction of the smart antenna 2 are newly stored in the channel setting table T of the memory 8.

In the above-described channel ADD process shown in FIG. 11, the user can instruct whether or not the direction information of the smart antenna 2 is stored. Accordingly, when the directive direction in which the broadcasting of the desired cannel can be most preferably received is specified, the user instructs the direction information to be stored. Thus, the user can correlate the channel information of the desired channel with the direction information showing the specified directive direction (the directive direction when the user instructs the direction information to be stored) to store the correlated information in the channel setting table T of the memory 8. Thus, the desired channel can be set. Then, when the desired channel is set as described above, the desired channel is subsequently selected. At this time, since the direction information corresponding to the desired channel is stored in the channel setting table T, the directive direction of the smart antenna 2 is switched to the direction shown by the direction information. Thus, the broadcasting of the desired channel can be most preferably received and the time necessary until the broadcasting of the desired channel can be looked at and listened to in a most preferable state can be shortened. On the other hand, when the directive direction in which the broadcasting of the desired channel can be most preferably received is not specified, only the channel information of the desired channel is stored in the channel setting table T. Thus, the desired channel can be set as the receiving channel and the time necessary for setting the desired channel as the receiving channel can be shortened. Then, when the desired channel is set in such a way, the desired channel is subsequently selected. At this time, since the direction information corresponding to the desired channel is not stored in the channel setting table T, while the directive direction of the smart antenna 2 is rapidly switched, the direction in which the broadcasting of the desired channel can be most preferably received can be searched without being restricted by the information stored in the channel setting table T and the time required until the broadcasting can be looked at and listened to in a most preferable state can be shortened.

Further, when the "YES" button B3 is pressed to instruct the direction information to be stored, the direction information showing the directive direction to which the smart antenna 2 is directed is stored. Thus, the direction information can be stored at timing desired by the user. Therefore, before the control unit 4 specifies the directive direction in which the broadcasting of the desired channel can be most preferably received, the user watches the displayed state of an image in the ADD screen G or the varied state of the thick arrow mark in the direction view D. Then, the user determines the directive direction in which the broadcasting of the desired channel can be preferably received to a certain degreed and correlates the direction information showing the direction with the channel information to store the correlated information. Thus, the time necessary for setting the desired channel can be shortened.

Further, when the user watches the displayed state of the image in the ADD screen G or the varied state of the thick arrow mark in the direction view D so that the user can easily grasp whether or not the directive direction of the smart antenna 2 in which the broadcasting of the desired channel can be most preferably received is specified. Accordingly, the user can readily decide whether or not the direction information of the smart antenna 2 is stored and can readily designate the directive direction to be stored. Thus, the time required for setting the desired channel can be more reduced.

Figure 14:
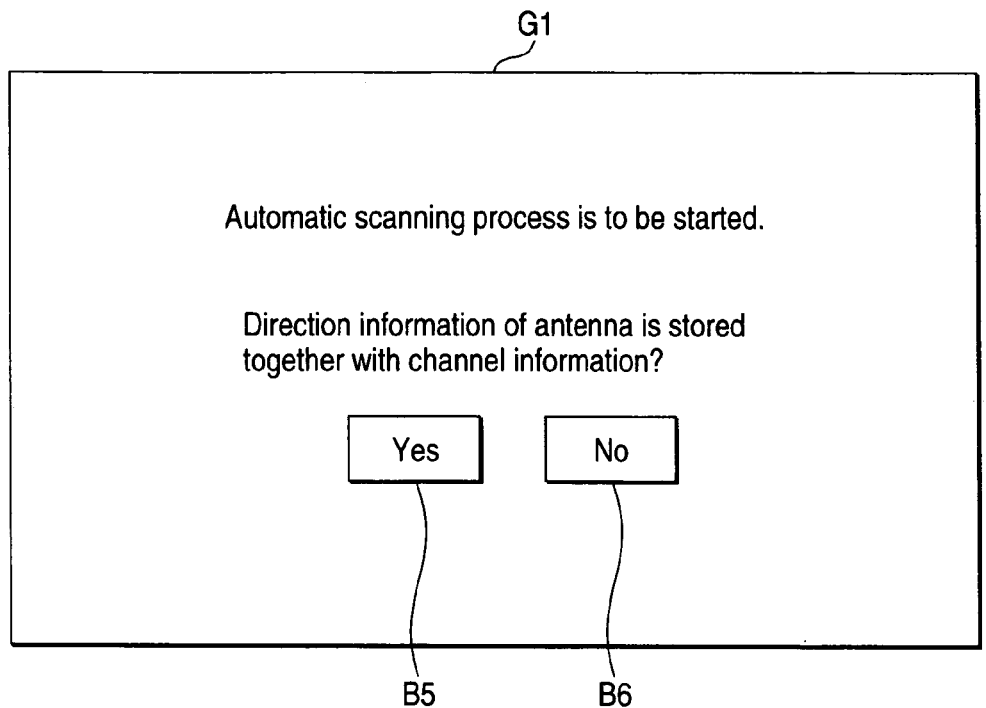
FIG. 14 is a diagram showing one example of a television display screen in a still another embodiment.

In the above-described embodiments, examples are described in which the present invention is applied to the channel ADD process for additionally setting the channel. However, the present invention may be applied to the automatic scanning process in which all channels capable of receiving airwaves are set as receiving channels as well as the channel ADD process. In this case, immediately after the automatic scanning process is started, an inquiry screen G1 as shown in FIG. 14 may be displayed on the TV set 3 to inquire simultaneously all channels as receiving candidates about whether or not direction information is stored and allow them to instruct by a "YES" button B5 or a "NO" button B6.

Figure 15:
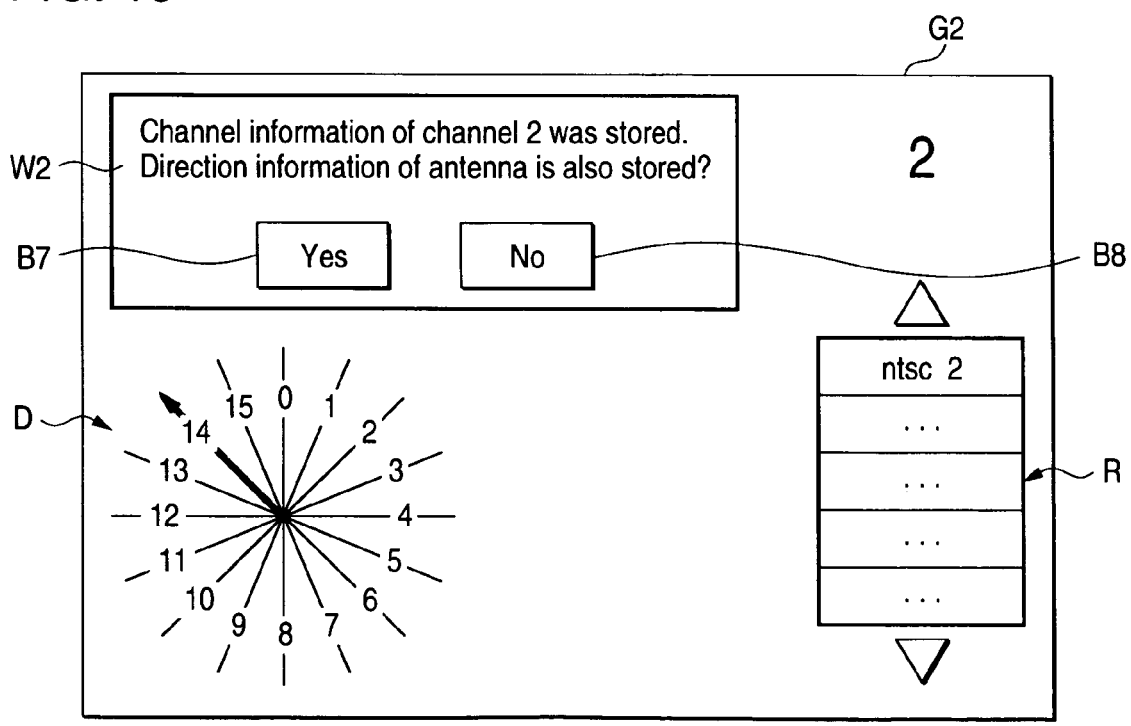
FIG. 15 is a diagram showing one example of a television display screen in a still another embodiment.

Further, after one channel is selected from among the receiving candidates, an automatic scanning screen G2 as shown in FIG. 15 is displayed on the TV set 3. Further, an inquiry window W2 may be displayed in the screen G2 to inquire individually whether or not the direction information is stored for each of the channels and to allow the channels to instruct by a "YES" button B7 or a "NO" button B8. Further, only for the channels in which the directive direction capable of most preferably receiving the broadcasting can not be specified, the window W2 may be displayed to inquire whether or not the direction information is stored. The inquiry screen G1 and the inquiry window W2 form an example of an inquiring and instructing unit in the present invention.

In the above-described embodiments, cases in which the present invention is applied to the broadcast receiver 1 to which the smart antenna 2 is connected is described as examples. The present invention is not limited thereto and may be applied to a broadcast receiver to which an antenna such as an adaptive array antenna other than the smart antenna capable of switching directivity to a plurality of directions is connected. Further, the present invention may be applied to, for instance, a broadcast receiver for receiving a radio broadcasting or a broadcast receiver for receiving a satellite broadcasting.

What is claimed is:

1. A broadcast receiver for receiving a television broadcasting of a prescribed channel transmitted from a broadcasting station by a smart antenna capable of switching directivity to a plurality of preset directions, the broadcast receiver comprising:

a control unit for controlling the smart antenna to switch a directive direction;

a memory for storing channel information showing the prescribed channel and direction information showing the directive direction of the smart antenna;

an instructing unit for allowing a user to instruct the prescribed channel to be set as a receiving channel; and an inquiring and instructing unit for allowing the user to inquire and instruct whether or not the direction information of the smart antenna is stored, wherein while the control unit controls the directive direction of the smart antenna to be scanned through 360 degrees in azimuth, the control unit controls the smart antenna to receive the broadcasting of the prescribed channel, the control unit controls a television receiver to display an image of the received broadcasting and the directive direction to which the smart antenna is directed at any time, and when a direction in which the broadcasting of the prescribed channel can be most preferably received can be specified, the control unit holds the directive direction of the smart antenna in the direction, when the user instructs the instructing unit to set the prescribed channel as the receiving channel and the user instructs the inquiring and instructing unit to store the direction information of the smart antenna, the control unit correlates the channel information of the prescribed channel with the direction information showing the directive direction to which the smart antenna is directed when the user instructs the inquiring and instructing unit to store the direction information and stores the correlated information in the memory, and when the user instructs the instructing unit to set the prescribed channel as the receiving channel and the user instructs the inquiring and instructing unit not to store the direction information of the smart antenna, the control unit stores only the channel information of the prescribed channel in the memory;

wherein the control unit is configured to control the directive direction based on the direction information in a case that the direction information is stored in the memory, and is configured to control the directive direction rapidly in a case that the direction information is not stored in the memory.

2. A broadcast receiver for receiving a broadcasting of a prescribed channel transmitted from a broadcasting station by a directivity switching antenna capable of switching directivity to a plurality of preset directions, the broadcast receiver comprising:

a control unit for controlling the directivity switching antenna to switch a directive direction;

a memory for storing channel information showing the prescribed channel and direction information showing the directive direction of the directivity switching antenna; and an instructing unit for allowing a user to instruct the prescribed channel to be set as a receiving channel, wherein when the user instructs the instructing unit to set the prescribed channel as the receiving channel, the control unit stores only the channel information of the prescribed channel in the memory;

wherein the control unit is configured to control the directive direction based on the direction information in a case that the direction information is stored in the memory, and is configured to control the directive direction rapidly in a case that the direction information is not stored in the memory.

3. The broadcast receiver according to claim 2, wherein while the control unit controls the directive direction of the directivity switching antenna to be scanned through 360 degrees in azimuth, the control unit controls the directivity switching antenna to receive the broadcasting of the prescribed channel, the control unit controls a reproducing unit to reproduce the received broadcasting at any time, and when a direction in which the broadcasting of the prescribed channel can be most preferably received can be specified, the control unit holds the directive direction of the directivity switching antenna in the direction.

4. The broadcast receiver according to claim 2, wherein the control unit controls a display unit to display the directive direction to which the directivity switching antenna is directed at any time.

5. A broadcast receiver for receiving a broadcasting of a prescribed channel transmitted from a broadcasting station by a directivity switching antenna capable of switching directivity to a plurality of preset directions, the broadcast receiver comprising:

a control unit for controlling the directivity switching antenna to switch a directive direction;

a memory for storing channel information showing the prescribed channel and direction information showing the directive direction of the directivity switching antenna;

an instructing unit for allowing a user to instruct the prescribed channel to be set as a receiving channel; and an inquiring and instructing unit for allowing the user to inquire and instruct whether or not the direction information of the directivity switching antenna is stored;

wherein when the user instructs the instructing unit instructs to set the prescribed channel as the receiving channel and the user instructs the inquiring and instructing unit to store the direction information of the directivity switching antenna, the control unit correlates the channel information of the prescribed channel with the direction information of the directivity switching antenna and stores the correlated information in the memory, and when the user instructs the instructing unit to set the prescribed channel as the receiving channel and the user instructs the inquiring and instructing unit instructs not to store the direction information of the directivity switching antenna, the control unit stores only the channel information of the prescribed channel in the memory;

wherein the control unit is configured to control the directive direction based on the direction information in a case that the direction information is stored in the memory, and is configured to control the directive direction rapidly in a case that the direction information is not stored in the memory.

6. The broadcast receiver according to claim 5, wherein when the user instructs the inquiring and instructing unit to store the direction information, the control unit correlates the direction information showing the directive direction to which the directivity switching antenna is directed with the channel information and stores the correlated information in the memory.

* * * * *